(12) United States Patent
VanderPloeg et al.

(10) Patent No.: US 9,720,278 B2
(45) Date of Patent: Aug. 1, 2017

(54) LOW COST OPTICAL FILM STACK

(71) Applicant: Gentex Corporation, Zeeland, MI (US)

(72) Inventors: John A. VanderPloeg, Zeeland, MI (US); Andrew D. Weller, Holland, MI (US); Ethan J. Lee, Byron Center, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/003,096

(22) Filed: Jan. 21, 2016

(65) Prior Publication Data

US 2016/0216560 A1    Jul. 28, 2016

Related U.S. Application Data

(60) Provisional application No. 62/106,341, filed on Jan. 22, 2015.

(51) Int. Cl.
  *B60Q 3/00*  (2017.01)
  *G02B 5/00*  (2006.01)
  (Continued)

(52) U.S. Cl.
  CPC ........ *G02F 1/133606* (2013.01); *B60R 1/088* (2013.01); *B60R 1/12* (2013.01);
  (Continued)

(58) Field of Classification Search
  CPC ... B60R 1/088; B60R 1/12; B60R 2001/1215; G02B 2027/0118; G02B 27/0101;
  (Continued)

(56) References Cited

U.S. PATENT DOCUMENTS 2,131,888 A  10/1938  Harris
2,632,040 A   3/1953  Rabinow
(Continued)

FOREIGN PATENT DOCUMENTS

EP  0513476    11/1992
EP  0899157 A1  3/1999
(Continued)

OTHER PUBLICATIONS

TW 200743875—Dec. 1, 2007, English Translation.*
(Continued)

*Primary Examiner* — Peggy Neils
(74) *Attorney, Agent, or Firm* — Price Heneveld LLP; Bradley D. Johnson

(57) ABSTRACT

A rearview assembly for a vehicle includes a housing for attachment to the vehicle, a glass element disposed in the housing and a display disposed behind the mirror element in the housing. The display contains a light source for emitting light, a first brightness enhancement film having a first plurality of prismatic elements extending in a first direction and positioned to receive light emitted from the light source, a diffuser configured to transmit about 97% of light from the first brightness enhancing film, a second brightness enhancement film having a plurality of prismatic elements extending in a second direction and positioned to receive light exiting the diffuser, and a display element disposed to receive light from the second brightness enhancement film with the display element having a second plurality of prismatic elements extending in a second direction. The first direction is substantially vertical and the second direction is substantially horizontal.

20 Claims, 7 Drawing Sheets

(51) Int. Cl.
*G02F 1/1335* (2006.01)
*F21V 8/00* (2006.01)
*B60R 1/12* (2006.01)
*G02B 27/01* (2006.01)
*B60R 1/08* (2006.01)
*G02B 5/30* (2006.01)

(52) U.S. Cl.
CPC .............. *G02B 5/30* (2013.01); *G02B 6/0051* (2013.01); *G02B 6/0053* (2013.01); *G02B 6/0073* (2013.01); *G02B 27/0101* (2013.01); *G02F 1/133603* (2013.01); *G02F 1/133611* (2013.01); *B60R 2001/1215* (2013.01); *G02B 2027/0118* (2013.01); *G02F 2001/133607* (2013.01)

(58) Field of Classification Search
CPC .. G02B 6/0051; G02B 6/0053; G02B 6/0073; G02B 5/30; G02F 1/133603; G02F 1/133606; G02F 1/133611; G02F 2001/133607
See application file for complete search history.

(56) References Cited

U.S. PATENT DOCUMENTS

| | | |
|---|---|---|
| 2,827,594 A | 3/1958 | Rabinow |
| 3,179,845 A | 4/1965 | Kulwiec |
| 3,581,276 A | 5/1971 | Newman |
| 3,663,819 A | 5/1972 | Hicks et al. |
| 4,109,235 A | 8/1978 | Bouthors |
| 4,139,801 A | 2/1979 | Linares |
| 4,151,526 A | 4/1979 | Hinachi et al. |
| 4,214,266 A | 7/1980 | Myers |
| 4,236,099 A | 11/1980 | Rosenblum |
| 4,257,703 A | 3/1981 | Goodrich |
| 4,258,979 A | 3/1981 | Mahin |
| 4,277,804 A | 7/1981 | Robison |
| 4,286,308 A | 8/1981 | Wolff |
| 4,310,851 A | 1/1982 | Pierrat |
| 4,357,558 A | 11/1982 | Massoni et al. |
| 4,376,909 A | 3/1983 | Tagami et al. |
| 4,479,173 A | 10/1984 | Rumpakis |
| 4,499,451 A | 2/1985 | Suzuki et al. |
| 4,599,544 A | 7/1986 | Martin |
| 4,638,287 A | 1/1987 | Umebayashi et al. |
| 4,645,975 A | 2/1987 | Meitzler et al. |
| 4,665,321 A | 5/1987 | Chang et al. |
| 4,665,430 A | 5/1987 | Hiroyasu |
| 4,692,798 A | 9/1987 | Seko et al. |
| 4,716,298 A | 12/1987 | Etoh |
| 4,727,290 A | 2/1988 | Smith et al. |
| 4,740,838 A | 4/1988 | Mase et al. |
| 4,768,135 A | 8/1988 | Kretschmer et al. |
| 4,862,037 A | 8/1989 | Farber et al. |
| 4,891,559 A | 1/1990 | Matsumoto et al. |
| 4,910,591 A | 3/1990 | Petrossian et al. |
| 4,930,742 A | 6/1990 | Schofield et al. |
| 4,934,273 A | 6/1990 | Endriz |
| 4,967,319 A | 10/1990 | Seko |
| 5,005,213 A | 4/1991 | Hanson et al. |
| 5,008,946 A | 4/1991 | Ando |
| 5,027,200 A | 6/1991 | Petrossian et al. |
| 5,036,437 A | 7/1991 | Macks |
| 5,072,154 A | 12/1991 | Chen |
| 5,086,253 A | 2/1992 | Lawler |
| 5,096,287 A | 3/1992 | Kakinami et al. |
| 5,121,200 A | 6/1992 | Choi et al. |
| 5,124,549 A | 6/1992 | Michaels et al. |
| 5,166,681 A | 11/1992 | Bottesch et al. |
| 5,182,502 A | 1/1993 | Slotkowski et al. |
| 5,187,383 A | 2/1993 | Taccetta et al. |
| 5,197,562 A | 3/1993 | Kakinami et al. |
| 5,230,400 A | 7/1993 | Kakainami et al. |
| 5,235,178 A | 8/1993 | Hegyi |
| 5,243,417 A | 9/1993 | Pollard |
| 5,289,321 A | 2/1994 | Secor |
| 5,296,924 A | 3/1994 | Blancard et al. |
| 5,304,980 A | 4/1994 | Maekawa |
| 5,329,206 A | 7/1994 | Slotkowski et al. |
| 5,347,261 A | 9/1994 | Adell |
| 5,347,459 A | 9/1994 | Greenspan et al. |
| 5,355,146 A | 10/1994 | Chiu et al. |
| 5,379,104 A | 1/1995 | Takao |
| 5,386,285 A | 1/1995 | Asayama |
| 5,396,054 A | 3/1995 | Krichever et al. |
| 5,402,170 A | 3/1995 | Parulski et al. |
| 5,408,357 A | 4/1995 | Beukema |
| 5,414,461 A | 5/1995 | Kishi et al. |
| 5,416,318 A | 5/1995 | Hegyi |
| 5,418,610 A | 5/1995 | Fischer |
| 5,424,952 A | 6/1995 | Asayama |
| 5,426,294 A | 6/1995 | Kobayashi et al. |
| 5,428,464 A | 6/1995 | Silverbrook |
| 5,430,450 A | 7/1995 | Holmes |
| 5,434,407 A | 7/1995 | Bauer et al. |
| 5,451,822 A | 9/1995 | Bechtel et al. |
| 5,452,004 A | 9/1995 | Roberts |
| 5,469,298 A | 11/1995 | Suman et al. |
| 5,471,515 A | 11/1995 | Fossum et al. |
| 5,475,441 A | 12/1995 | Parulski et al. |
| 5,475,494 A | 12/1995 | Nishida et al. |
| 5,481,268 A | 1/1996 | Higgins |
| 5,483,346 A | 1/1996 | Butzer |
| 5,483,453 A | 1/1996 | Uemura et al. |
| 5,485,155 A | 1/1996 | Hibino |
| 5,485,378 A | 1/1996 | Franke et al. |
| 5,488,496 A | 1/1996 | Pine |
| 5,508,592 A | 4/1996 | Lapatovich et al. |
| 5,515,448 A | 5/1996 | Nishitani |
| 5,523,811 A | 6/1996 | Wada et al. |
| 5,530,421 A | 6/1996 | Marshall et al. |
| 5,535,144 A | 7/1996 | Kise |
| 5,537,003 A | 7/1996 | Bechtel et al. |
| 5,541,590 A | 7/1996 | Nishio |
| 5,541,724 A | 7/1996 | Hoashi |
| 5,550,677 A | 8/1996 | Schofield et al. |
| 5,554,912 A | 9/1996 | Thayer et al. |
| 5,574,443 A | 11/1996 | Hsieh |
| 5,574,463 A | 11/1996 | Shirai et al. |
| 5,576,975 A | 11/1996 | Sasaki et al. |
| 5,587,929 A | 12/1996 | League et al. |
| 5,592,146 A | 1/1997 | Kover, Jr. et al. |
| 5,602,542 A | 2/1997 | Windmann et al. |
| 5,614,788 A | 3/1997 | Mullins et al. |
| 5,615,023 A | 3/1997 | Yang |
| 5,617,085 A | 4/1997 | Tsutsumi et al. |
| 5,621,460 A | 4/1997 | Hatlestad et al. |
| 5,634,709 A | 6/1997 | Iwama |
| 5,642,238 A | 6/1997 | Sala |
| 5,646,614 A | 7/1997 | Abersfelder et al. |
| 5,650,765 A | 7/1997 | Park |
| 5,660,454 A | 8/1997 | Mori et al. |
| 5,666,028 A | 9/1997 | Bechtel et al. |
| 5,670,935 A | 9/1997 | Schofield et al. |
| 5,680,123 A | 10/1997 | Lee |
| 5,684,473 A | 11/1997 | Hibino et al. |
| 5,707,129 A | 1/1998 | Kobayashi |
| 5,708,410 A | 1/1998 | Blank et al. |
| 5,708,857 A | 1/1998 | Ishibashi |
| 5,710,565 A | 1/1998 | Shirai et al. |
| 5,714,751 A | 2/1998 | Chen |
| 5,715,093 A | 2/1998 | Schierbeek et al. |
| 5,729,194 A | 3/1998 | Spears et al. |
| 5,736,816 A | 4/1998 | Strenke et al. |
| 5,745,050 A | 4/1998 | Nakagawa |
| 5,751,211 A | 5/1998 | Shirai et al. |
| 5,751,832 A | 5/1998 | Panter et al. |
| 5,754,099 A | 5/1998 | Nishimura et al. |
| 5,760,828 A | 6/1998 | Cortes |
| 5,764,139 A | 6/1998 | Nojima et al. |
| 5,767,793 A | 6/1998 | Agravante et al. |
| 5,781,105 A | 7/1998 | Bitar et al. |

(56) References Cited

U.S. PATENT DOCUMENTS

| | | |
|---|---|---|
| 5,786,787 A | 7/1998 | Eriksson et al. |
| 5,793,308 A | 8/1998 | Rosinski et al. |
| 5,793,420 A | 8/1998 | Schmidt |
| 5,796,094 A | 8/1998 | Schofield et al. |
| 5,798,727 A | 8/1998 | Shirai et al. |
| 5,811,888 A | 9/1998 | Hsieh |
| 5,812,321 A | 9/1998 | Schierbeek et al. |
| 5,837,994 A | 11/1998 | Stam et al. |
| 5,841,126 A | 11/1998 | Fossum et al. |
| 5,844,505 A | 12/1998 | Van Ryzin |
| 5,845,000 A | 12/1998 | Breed et al. |
| 5,850,176 A | 12/1998 | Kinoshita et al. |
| 5,867,214 A | 2/1999 | Anderson et al. |
| 5,877,897 A | 3/1999 | Schofield et al. |
| 5,883,739 A | 3/1999 | Ashihara et al. |
| 5,904,729 A | 5/1999 | Ruzicka |
| 5,905,457 A | 5/1999 | Rashid |
| 5,912,534 A | 6/1999 | Benedict |
| 5,923,027 A | 7/1999 | Stam et al. |
| 5,935,613 A | 8/1999 | Benham et al. |
| 5,940,011 A | 8/1999 | Agravante et al. |
| 5,942,853 A | 8/1999 | Piscart |
| 5,949,331 A | 9/1999 | Schofield et al. |
| 5,956,079 A | 9/1999 | Ridgley |
| 5,956,181 A | 9/1999 | Lin |
| 5,959,555 A | 9/1999 | Furuta |
| 5,990,469 A | 11/1999 | Bechtel et al. |
| 6,008,486 A | 12/1999 | Stam et al. |
| 6,009,359 A | 12/1999 | El-Hakim et al. |
| 6,018,308 A | 1/2000 | Shirai |
| 6,025,872 A | 2/2000 | Ozaki et al. |
| 6,046,766 A | 4/2000 | Sakata |
| 6,049,171 A | 4/2000 | Stam et al. |
| 6,060,989 A | 5/2000 | Gehlot |
| 6,061,002 A | 5/2000 | Weber et al. |
| 6,067,111 A | 5/2000 | Hahn et al. |
| 6,072,391 A | 6/2000 | Suzuki et al. |
| 6,078,355 A | 6/2000 | Zengel |
| 6,097,023 A | 8/2000 | Schofield et al. |
| 6,102,546 A | 8/2000 | Carter |
| 6,106,121 A | 8/2000 | Buckley et al. |
| 6,111,498 A | 8/2000 | Jobes et al. |
| 6,115,651 A | 9/2000 | Cruz |
| 6,122,597 A | 9/2000 | Saneyoshi et al. |
| 6,128,576 A | 10/2000 | Nishimoto et al. |
| 6,130,421 A | 10/2000 | Bechtel et al. |
| 6,130,448 A | 10/2000 | Bauer et al. |
| 6,140,933 A | 10/2000 | Bugno et al. |
| 6,144,158 A | 11/2000 | Beam |
| 6,151,065 A | 11/2000 | Steed et al. |
| 6,151,539 A | 11/2000 | Bergholz et al. |
| 6,154,149 A | 11/2000 | Tychkowski et al. |
| 6,157,294 A | 12/2000 | Urai et al. |
| 6,166,629 A | 12/2000 | Hamma |
| 6,166,698 A | 12/2000 | Turnbull et al. |
| 6,167,755 B1 | 1/2001 | Damson et al. |
| 6,172,600 B1 | 1/2001 | Kakinami et al. |
| 6,172,601 B1 | 1/2001 | Wada et al. |
| 6,175,300 B1 | 1/2001 | Kendrick |
| 6,184,781 B1 | 2/2001 | Ramakesavan |
| 6,185,492 B1 | 2/2001 | Kagawa et al. |
| 6,191,704 B1 | 2/2001 | Takenaga et al. |
| 6,200,010 B1 | 3/2001 | Anders |
| 6,218,934 B1 | 4/2001 | Regan |
| 6,222,447 B1 | 4/2001 | Schofield et al. |
| 6,249,214 B1 | 6/2001 | Kashiwazaki |
| 6,250,766 B1 | 6/2001 | Strumolo et al. |
| 6,255,639 B1 | 7/2001 | Stam et al. |
| 6,259,475 B1 | 7/2001 | Ramachandran et al. |
| 6,265,968 B1 | 7/2001 | Betzitza et al. |
| 6,268,803 B1 | 7/2001 | Gunderson et al. |
| 6,269,308 B1 | 7/2001 | Kodaka et al. |
| 6,281,632 B1 | 8/2001 | Stam et al. |
| 6,281,804 B1 | 8/2001 | Haller et al. |
| 6,289,332 B2 | 9/2001 | Menig et al. |
| 6,300,879 B1 | 10/2001 | Regan et al. |
| 6,304,173 B2 | 10/2001 | Pala et al. |
| 6,317,057 B1 | 11/2001 | Lee |
| 6,320,612 B1 | 11/2001 | Young |
| 6,324,295 B1 | 11/2001 | Valery et al. |
| 6,329,925 B1 | 12/2001 | Skiver et al. |
| 6,330,511 B2 | 12/2001 | Ogura et al. |
| 6,335,680 B1 | 1/2002 | Matsuoka |
| 6,344,805 B1 | 2/2002 | Yasui et al. |
| 6,348,858 B2 | 2/2002 | Weis et al. |
| 6,349,782 B1 | 2/2002 | Sekiya et al. |
| 6,356,206 B1 | 3/2002 | Takenaga et al. |
| 6,356,376 B1 | 3/2002 | Tonar et al. |
| 6,357,883 B1 | 3/2002 | Strumolo et al. |
| 6,363,326 B1 | 3/2002 | Scully |
| 6,369,701 B1 | 4/2002 | Yoshida et al. |
| 6,379,013 B1 | 4/2002 | Bechtel et al. |
| 6,396,040 B1 | 5/2002 | Hill |
| 6,396,397 B1 | 5/2002 | Bos et al. |
| 6,403,942 B1 | 6/2002 | Stam |
| 6,408,247 B1 | 6/2002 | Ichikawa et al. |
| 6,412,959 B1 | 7/2002 | Tseng |
| 6,415,230 B1 | 7/2002 | Maruko et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,892 B1 | 7/2002 | Matsuoka |
| 6,428,172 B1 | 8/2002 | Hutzel et al. |
| 6,433,680 B1 | 8/2002 | Ho |
| 6,437,688 B1 | 8/2002 | Kobayashi |
| 6,438,491 B1 | 8/2002 | Farmer |
| 6,441,872 B1 | 8/2002 | Ho |
| 6,442,465 B2 | 8/2002 | Breed et al. |
| 6,443,602 B1 | 9/2002 | Tanabe et al. |
| 6,447,128 B1 | 9/2002 | Lang et al. |
| 6,452,533 B1 | 9/2002 | Yamabuchi et al. |
| 6,463,369 B2 | 10/2002 | Sadano et al. |
| 6,465,962 B1 | 10/2002 | Fu et al. |
| 6,466,701 B1 | 10/2002 | Ejiri et al. |
| 6,469,739 B1 | 10/2002 | Bechtel et al. |
| 6,472,977 B1 | 10/2002 | Pochmuller |
| 6,473,001 B1 | 10/2002 | Blum |
| 6,476,731 B1 | 11/2002 | Miki et al. |
| 6,476,855 B1 | 11/2002 | Yamamoto |
| 6,483,429 B1 | 11/2002 | Yasui et al. |
| 6,483,438 B2 | 11/2002 | DeLine et al. |
| 6,487,500 B2 | 11/2002 | Lemelson et al. |
| 6,491,416 B1 | 12/2002 | Strazzanti |
| 6,498,620 B2 | 12/2002 | Schofield et al. |
| 6,501,387 B2 | 12/2002 | Skiver et al. |
| 6,507,779 B2 | 1/2003 | Breed et al. |
| 6,515,581 B1 | 2/2003 | Ho |
| 6,515,597 B1 | 2/2003 | Wada et al. |
| 6,520,667 B1 | 2/2003 | Mousseau |
| 6,522,969 B2 | 2/2003 | Kannonji |
| 6,542,085 B1 | 4/2003 | Yang |
| 6,542,182 B1 | 4/2003 | Chutorash |
| 6,545,598 B1 | 4/2003 | De Villeroche |
| 6,550,943 B2 | 4/2003 | Strazzanti |
| 6,553,130 B1 | 4/2003 | Lemelson et al. |
| 6,558,026 B2 | 5/2003 | Strazzanti |
| 6,559,761 B1 | 5/2003 | Miller et al. |
| 6,572,233 B1 | 6/2003 | Northman et al. |
| 6,575,643 B2 | 6/2003 | Takahashi |
| 6,580,373 B1 | 6/2003 | Ohashi |
| 6,581,007 B2 | 6/2003 | Hasegawa et al. |
| 6,583,730 B2 | 6/2003 | Lang et al. |
| 6,587,573 B1 | 7/2003 | Stam et al. |
| 6,591,192 B2 | 7/2003 | Okamura et al. |
| 6,594,583 B2 | 7/2003 | Ogura et al. |
| 6,594,614 B2 | 7/2003 | Studt et al. |
| 6,611,202 B2 | 8/2003 | Schofield et al. |
| 6,611,227 B1 | 8/2003 | Nebiyeloul-Kifle |
| 6,611,610 B1 | 8/2003 | Stam et al. |
| 6,611,759 B2 | 8/2003 | Brosche |
| 6,614,387 B1 | 9/2003 | Deadman |
| 6,616,764 B2 | 9/2003 | Kramer et al. |
| 6,617,564 B2 | 9/2003 | Ockerse et al. |
| 6,618,672 B2 | 9/2003 | Sasaki et al. |

(56) References Cited

U.S. PATENT DOCUMENTS

| | | |
|---|---|---|
| 6,630,888 B2 | 10/2003 | Lang et al. |
| 6,631,316 B2 | 10/2003 | Stam et al. |
| 6,636,258 B2 | 10/2003 | Strumolo |
| 6,642,840 B2 | 11/2003 | Lang et al. |
| 6,642,851 B2 | 11/2003 | Deline et al. |
| 6,648,477 B2 | 11/2003 | Hutzel et al. |
| 6,665,592 B2 | 12/2003 | Kodama |
| 6,670,207 B1 | 12/2003 | Roberts |
| 6,670,910 B2 | 12/2003 | Delcheccolo et al. |
| 6,674,370 B2 | 1/2004 | Rodewald et al. |
| 6,675,075 B1 | 1/2004 | Engelsberg et al. |
| 6,677,986 B1 | 1/2004 | Pöchmüller |
| 6,683,539 B1 | 1/2004 | Trajkovic et al. |
| 6,683,969 B1 | 1/2004 | Nishigaki et al. |
| 6,690,268 B2 | 2/2004 | Schofield et al. |
| 6,690,413 B1 | 2/2004 | Moore |
| 6,693,517 B2 | 2/2004 | McCarty et al. |
| 6,693,518 B2 | 2/2004 | Kumata |
| 6,693,519 B2 | 2/2004 | Keirstead |
| 6,693,524 B1 | 2/2004 | Payne |
| 6,717,610 B1 | 4/2004 | Bos et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,737,964 B2 | 5/2004 | Samman et al. |
| 6,738,088 B1 | 5/2004 | Uskolovsky et al. |
| 6,744,353 B2 | 6/2004 | Sjonell |
| 6,772,057 B2 | 8/2004 | Breed et al. |
| 6,774,988 B2 | 8/2004 | Stam et al. |
| 6,846,098 B2 | 1/2005 | Bourdelais et al. |
| 6,847,487 B2 | 1/2005 | Burgner |
| 6,861,809 B2 | 3/2005 | Stam |
| 6,902,307 B2 | 6/2005 | Strazzanti |
| 6,912,001 B2 | 6/2005 | Okamoto et al. |
| 6,913,375 B2 | 7/2005 | Strazzanti |
| 6,923,080 B1 | 8/2005 | Dobler et al. |
| 6,930,737 B2 | 8/2005 | Weindorf et al. |
| 6,946,978 B2 | 9/2005 | Schofield |
| 7,012,543 B2 | 3/2006 | DeLine et al. |
| 7,038,577 B2 | 5/2006 | Pawlicki et al. |
| 7,046,448 B2 | 5/2006 | Burgner |
| 7,175,291 B1 | 2/2007 | Li |
| 7,255,465 B2 | 8/2007 | DeLine et al. |
| 7,262,406 B2 | 8/2007 | Heslin et al. |
| 7,265,342 B2 | 9/2007 | Heslin et al. |
| 7,292,208 B1 | 11/2007 | Park et al. |
| 7,311,428 B2 | 12/2007 | DeLine et al. |
| 7,321,112 B2 | 1/2008 | Stam et al. |
| 7,360,932 B2 | 4/2008 | Uken et al. |
| 7,417,221 B2 | 8/2008 | Creswick et al. |
| 7,446,650 B2 | 11/2008 | Scholfield et al. |
| 7,467,883 B2 | 12/2008 | DeLine et al. |
| 7,468,651 B2 | 12/2008 | DeLine et al. |
| 7,505,047 B2 | 3/2009 | Yoshimura |
| 7,533,998 B2 | 5/2009 | Schofield et al. |
| 7,548,291 B2 | 6/2009 | Lee et al. |
| 7,565,006 B2 | 7/2009 | Stam et al. |
| 7,567,291 B2 | 7/2009 | Bechtel et al. |
| 7,579,940 B2 | 8/2009 | Schofield et al. |
| 7,653,215 B2 | 1/2010 | Stam |
| 7,658,521 B2 | 2/2010 | DeLine et al. |
| 7,683,326 B2 | 3/2010 | Stam et al. |
| 7,711,479 B2 | 5/2010 | Taylor et al. |
| 7,719,408 B2 | 5/2010 | DeWard et al. |
| 7,720,580 B2 | 5/2010 | Higgins-Luthman |
| 7,815,326 B2 | 10/2010 | Blank et al. |
| 7,877,175 B2 | 1/2011 | Higgins-Luthman |
| 7,881,839 B2 | 2/2011 | Stam et al. |
| 7,888,629 B2 | 2/2011 | Heslin et al. |
| 7,914,188 B2 | 3/2011 | DeLine et al. |
| 7,972,045 B2 | 7/2011 | Schofield |
| 7,994,471 B2 | 8/2011 | Heslin et al. |
| 8,031,225 B2 | 10/2011 | Watanabe et al. |
| 8,045,760 B2 | 10/2011 | Stam et al. |
| 8,059,235 B2 | 11/2011 | Utsumi et al. |
| 8,063,753 B2 | 11/2011 | Deline et al. |
| 8,090,153 B2 | 1/2012 | Schofield et al. |
| 8,100,568 B2 | 1/2012 | Deline et al. |
| 8,116,929 B2 | 2/2012 | Higgins-Luthman |
| 8,120,652 B2 | 2/2012 | Bechtel et al. |
| 8,142,059 B2 | 3/2012 | Higgins-Luthman et al. |
| 8,162,518 B2 | 4/2012 | Schofield |
| 8,201,800 B2 | 6/2012 | Filipiak |
| 8,203,433 B2 | 6/2012 | Deuber et al. |
| 8,217,830 B2 | 7/2012 | Lynam |
| 8,222,588 B2 | 7/2012 | Schofield et al. |
| 8,237,909 B2 | 8/2012 | Ostreko et al. |
| 8,258,433 B2 | 9/2012 | Byers et al. |
| 8,282,226 B2 | 10/2012 | Blank et al. |
| 8,325,028 B2 | 12/2012 | Schofield et al. |
| 8,339,526 B2 * | 12/2012 | Minikey, Jr. ............... B60R 1/12 349/11 |
| 8,421,950 B2 * | 4/2013 | Kim .................... G02B 6/0093 349/58 |
| 8,482,683 B2 | 7/2013 | Hwang et al. |
| 2001/0019356 A1 | 9/2001 | Takeda et al. |
| 2001/0022616 A1 | 9/2001 | Rademacher et al. |
| 2001/0026316 A1 | 10/2001 | Senatore |
| 2001/0045981 A1 | 11/2001 | Gloger et al. |
| 2002/0040962 A1 | 4/2002 | Schofield et al. |
| 2002/0044065 A1 | 4/2002 | Quist et al. |
| 2002/0191127 A1 | 12/2002 | Roberts et al. |
| 2003/0002165 A1 | 1/2003 | Mathias et al. |
| 2003/0007261 A1 | 1/2003 | Hutzel et al. |
| 2003/0016125 A1 | 1/2003 | Lang et al. |
| 2003/0016287 A1 | 1/2003 | Nakayama et al. |
| 2003/0025596 A1 | 2/2003 | Lang et al. |
| 2003/0025597 A1 | 2/2003 | Schofield |
| 2003/0030546 A1 | 2/2003 | Tseng |
| 2003/0030551 A1 | 2/2003 | Ho |
| 2003/0030724 A1 | 2/2003 | Okamoto |
| 2003/0035050 A1 | 2/2003 | Mizusawa |
| 2003/0043269 A1 | 3/2003 | Park |
| 2003/0052969 A1 | 3/2003 | Satoh et al. |
| 2003/0058338 A1 | 3/2003 | Kawauchi et al. |
| 2003/0067383 A1 | 4/2003 | Yang |
| 2003/0076415 A1 | 4/2003 | Strumolo |
| 2003/0080877 A1 | 5/2003 | Takagi et al. |
| 2003/0085806 A1 | 5/2003 | Samman et al. |
| 2003/0088361 A1 | 5/2003 | Sekiguchi |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0098908 A1 | 5/2003 | Misaiji et al. |
| 2003/0103141 A1 | 6/2003 | Bechtel et al. |
| 2003/0103142 A1 | 6/2003 | Hitomi et al. |
| 2003/0117522 A1 | 6/2003 | Okada |
| 2003/0122929 A1 | 7/2003 | Minaudo et al. |
| 2003/0122930 A1 | 7/2003 | Schofield et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0202357 A1 | 10/2003 | Strazzanti |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 2/2004 | Lin |
| 2004/0032321 A1 | 2/2004 | McMahon et al. |
| 2004/0036768 A1 | 2/2004 | Green |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |

(56) References Cited

U.S. PATENT DOCUMENTS

| | | |
|---|---|---|
| 2004/0080404 A1 | 4/2004 | White |
| 2004/0080431 A1 | 4/2004 | White |
| 2004/0085196 A1 | 5/2004 | Milelr et al. |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0107030 A1 | 6/2004 | Nishira et al. |
| 2004/0107617 A1 | 6/2004 | Shoen et al. |
| 2004/0109060 A1 | 6/2004 | Ishii |
| 2004/0114039 A1 | 6/2004 | Ishikura |
| 2004/0119668 A1 | 6/2004 | Homma et al. |
| 2004/0125905 A1 | 7/2004 | Vlasenko et al. |
| 2004/0202001 A1 | 10/2004 | Roberts et al. |
| 2005/0140855 A1 | 6/2005 | Utsumi |
| 2005/0237440 A1 | 10/2005 | Sugimura et al. |
| 2006/0007550 A1 | 1/2006 | Tonar et al. |
| 2006/0115759 A1 | 6/2006 | Kim et al. |
| 2006/0139953 A1 | 6/2006 | Chou et al. |
| 2006/0158899 A1 | 7/2006 | Ayabe et al. |
| 2007/0171037 A1 | 7/2007 | Schofield et al. |
| 2008/0068520 A1 | 3/2008 | Minikey, Jr. et al. |
| 2008/0192132 A1 | 8/2008 | Bechtel et al. |
| 2008/0247192 A1 | 10/2008 | Hoshi et al. |
| 2008/0294315 A1 | 11/2008 | Breed |
| 2009/0015736 A1 | 1/2009 | Weller et al. |
| 2009/0141516 A1 | 6/2009 | Wu et al. |
| 2010/0201896 A1 | 8/2010 | Ostreko et al. |
| 2013/0028473 A1 | 1/2013 | Hilldore et al. |
| 2013/0279014 A1 | 10/2013 | Fish, Jr. et al. |
| 2013/0329401 A1* | 12/2013 | Yamamoto ........... G02B 5/0247 362/97.2 |
| 2014/0347488 A1 | 11/2014 | Tazaki et al. |
| 2015/0293272 A1* | 10/2015 | Pham ................... G02B 5/0221 359/599 |

FOREIGN PATENT DOCUMENTS

| | | | |
|---|---|---|---|
| EP | 2378350 B1 | 11/2013 | |
| GB | 2338363 | 12/1999 | |
| JP | 1178693 | 3/1999 | |
| JP | 2005148119 | 6/2005 | |
| JP | 2005327600 | 11/2005 | |
| JP | 2008139819 A | 6/2008 | |
| TW | 200743875 | * 12/2007 | ......... G02F 1/13357 |
| WO | 9621581 | 7/1996 | |
| WO | 2007103573 A2 | 9/2007 | |
| WO | 2010090964 | 8/2010 | |

OTHER PUBLICATIONS

Palalau et al., "FPD Evaluation for Automotive Application," Proceedings of the Vehicle Display Symposium, Nov. 2, 1995, pp. 97-103, Society for Information Display, Detroit Chapter, Santa Ana, CA.

Adler, "A New Automotive AMLCD Module," Proceedings of the Vehicle Display Symposium, Nov. 2, 1995, pp. 67-71, Society for Information Display, Detroit Chapter, Santa Ana, CA.

Sayer, et al., "In-Vehicle Displays for Crash Avoidance and Navigation Systems," Proceedings of the Vehicle Display Symposium, Sep. 18, 1996, pp. 39-42, Society for Information Display, Detroit Chapter, Santa Ana, CA.

Knoll, et al., "Application of Graphic Displays in Automobiles," SID 87 Digest, 1987, pp. 41-44, 5A.2.

Terada, et al., "Development of Central Information Display of Automotive Application," SID 89 Digest, 1989, pp. 192-195, Society for Information Display, Detroit Center, Santa Ana, CA.

Thomsen, et al., "AMLCD Design Considerations for Avionics and Vetronics Applications," Proceedings of the 5th Annual Flat Panel Display Strategic and Technical Symposium, Sep. 9-10, 1998, pp. 139-145, Society for Information Display, Metropolitan Detroit Chapter, CA.

Knoll, et al., "Conception of an Integrated Driver Information System," SID International Symposium Digest of Technical Papers, 1990, pp. 126-129, Society for Information Display, Detroit Center, Santa Ana, CA.

Vincen, "An Analysis of Direct-View FPDs for Automotive Multi-Media Applications," Proceedings of the 6th Annual Strategic and Technical Symposium "Vehicular Applications of Displays and Microsensors," Sep. 22-23, 1999, pp. 39-46, Society for Information Display, Metropolitan Detroit Chapter, San Jose, CA.

Zuk, et al., "Flat Panel Display Applications in Agriculture Equipment," Proceedings of the 5th Annual Flat Panel Display Strategic and Technical Symposium, Sep. 9-10, 1998, pp. 125-130, Society for Information Display, Metropolitan Detroit Chapter, CA.

Vijan, et al., "A 1.7-Mpixel Full-Color Diode Driven AM-LCD," SID International Symposium, 1990, pp. 530-533, Society for Information Display, Playa del Rey, CA.

Vincen, "The Automotive Challenge to Active Matrix LCD Technology," Proceedings of the Vehicle Display Symposium, 1996, pp. 17-21, Society for Information Display, Detroit Center, Santa Ana, CA.

Corsi, et al., "Reconfigurable Displays Used as Primary Automotive Instrumentation," SAE Technical Paper Series, 1989, pp. 13-18, Society of Automotive Engineers, Inc., Warrendale, PA.

Schumacher, "Automotive Display Trends," SID 96 Digest, 1997, pp. 1-6, Delco Electronics Corp., Kokomo, IN.

Knoll, "The Use of Displays in Automotive Applications," Journal of the SID 5/3 1997, pp. 165-172, 315-316, Stuttgart, Germany.

Donofrio, "Looking Beyond the Dashboard," SID 2002, pp. 30-34, Ann Arbor, MI.

Stone, "Automotive Display Specification," Proceedings of the Vehicle Display Symposium, 1995, pp. 93-96, Society for Information Display, Detroit Center, Santa Ana, CA.

International Searching Authority; Notification of Transmittal of the International Search Report and the Written Opinion of the International Searching Authority, or the Declaration; May 5, 2016; 9 pages; Russia.

* cited by examiner

LOW COST OPTICAL FILM STACK

CROSS-REFERENCE TO RELATED APPLICATIONS

This application claims the benefit of and priority to U.S. Provisional Patent Application No. 62/106,341, filed on Jan. 22, 2015, entitled "LOW COST OPTICAL FILM STACK," the entire disclosure of which is hereby incorporated herein by reference.

FIELD OF THE INVENTION

The present disclosure generally relates to a backlight assembly for a display, and more particularly, to a rearview assembly for a vehicle having a display using the inventive backlight assembly.

SUMMARY OF THE INVENTION

According to one aspect of this disclosure, a backlight assembly for a display having a polarized transmission axis includes a light source for emitting light and a first brightness enhancement film having a plurality of prismatic elements extending in a first direction. The brightness enhancing film is positioned to receive light emitted from the light source. The backlight assembly also includes a second brightness enhancement film having a plurality of prismatic elements extending in a second direction and a diffuser positioned to receive light exiting the first brightness enhancement film. Light exiting the diffuser enters the second brightness enhancement film.

According to another aspect of this disclosure, a display includes a light source for emitting light, a first brightness enhancement film having a plurality of prismatic elements extending in a first direction and positioned to receive light emitted from the light source, and a second brightness enhancement film having a plurality of prismatic elements extending in a second direction and positioned to receive light exiting the first brightness enhancement film. The display also includes a diffuser having a transmissivity to light of about 97%. The diffuser is disposed between the first brightness enhancing film and the second brightness enhancing film.

According to yet another aspect of this disclosure, a rearview assembly for a vehicle includes a housing for attachment to the vehicle, a glass element disposed in the housing and a display disposed behind the glass element in the housing. The display contains a light source for emitting light, a first brightness enhancement film having a first plurality of prismatic elements extending in a first direction and positioned to receive light emitted from the light source, a diffuser configured to transmit about 97% of light from the first brightness enhancing film, a second brightness enhancement film having a plurality of prismatic elements extending in a second direction and positioned to receive light exiting the diffuser, and a display element disposed to receive light from the second brightness enhancement film with the display element having a second plurality of prismatic elements extending in a second direction. The first direction is substantially vertical and the second direction is substantially horizontal.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION OF THE EMBODIMENTS

Figure 1A:
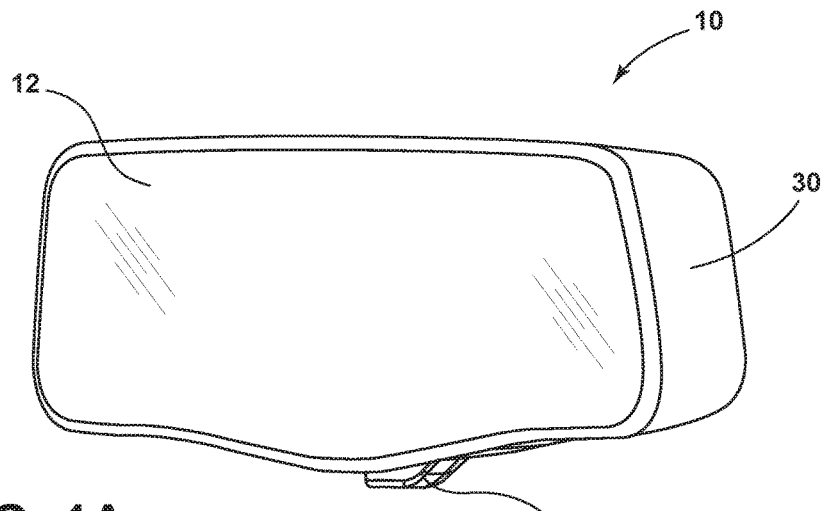
FIG. 1A is a front perspective view of a rearview assembly having a display constructed according to the embodiments described herein.

The present illustrated embodiments reside primarily in combinations of method steps and apparatus components related to a backlight assembly, particularly one adapted for use in a vehicle rearview assembly. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

Figure 1B:
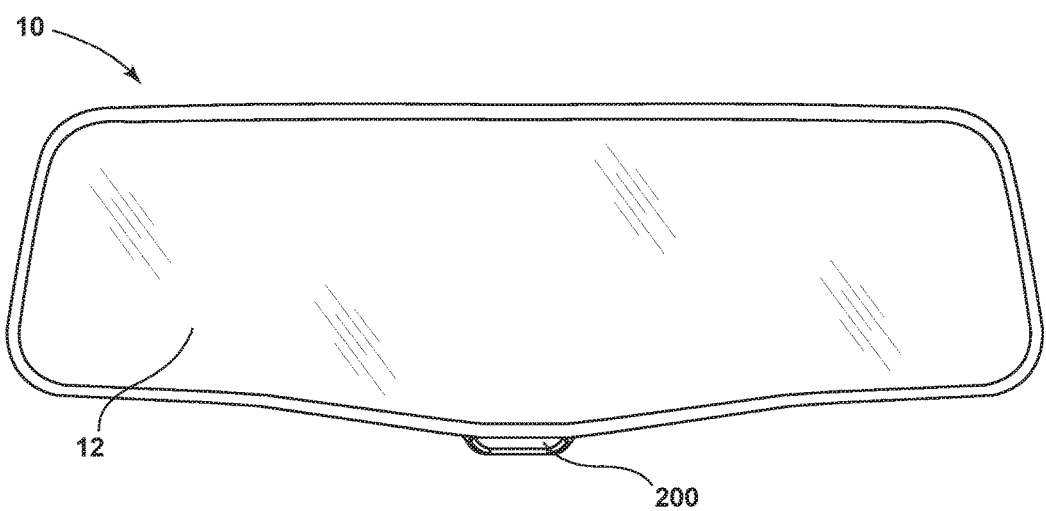
FIG. 1B is a front elevational view of the rearview assembly shown in FIG. 1A.

For purposes of description herein, the terms "upper," "lower," "right," "left," "rear," "front," "vertical," "horizontal," and derivatives thereof shall relate to the disclosure as oriented in FIGS. 1A and 1B. Unless stated otherwise, the term "front" shall refer to the surface of the element closer to an intended viewer of the rearview assembly, and the term "rear" shall refer to the surface of the element further from the intended viewer of the rearview assembly. However, it is to be understood that the invention may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Backlight assemblies for liquid crystal displays (LCDs) are known, which include one or more brightness enhancement films (BEFs). A BEF is used to enhance the brightness of the display in one dimension. Thus, to enhance brightness in both dimensions of the display, a first BEF is used to enhance the brightness in the vertical direction and a second BEF is used to enhance the brightness in the horizontal direction. A BEF generally includes a plurality of parallel prismatic elements that extend one direction on one surface of a film. To enhance brightness in a vertical direction, the BEF is arranged so that its prisms extend horizontally. To enhance brightness in a horizontal direction, the BEF is arranged so that its prisms extend vertically. Thus, when enhancing the brightness in both dimensions of the display, the BEFs are arranged with their prismatic elements at a 90 degree angle relative to one another. Backlight assemblies for LCDs are generally known to include diffusers for diffusing light emitted by the backlight assembly. Diffusion of the light by the diffuser provides an even illumination by softening any high points of transmissivity of light within the LCD or BEFs. Diffusers are known to be located behind, or in front of, the BEFs. LCDs typically include polarizers such that light from a backlight is polarized and the LCD element selectively transmits light from the backlight based upon the orientation of the liquid crystal molecules in the element. Light that is transmitted through the LCD element has a polarization that is aligned with the polarized transmission axis of the LCD element. For example, if the polarized transmission axis of the LCD is vertical, vertically polarized light is selectively transmitted through the LCD. Likewise, if the polarized transmission axis of the LCD is horizontal, horizontally polarized light is selectively transmitted through the LCD.

A problem occurs in certain circumstances where a viewer of the LCD is at a high viewing angle with respect to a display plane of the LCD. Specifically, the luminance of the LCD may appear to change by a noticeable amount as the viewing angle changes. The embodiments described herein reduce this problem by altering the order in which the diffuser and the BEFs are positioned and can further reduce this problem through the use of a high transmissivity diffuser.

Figure 2:
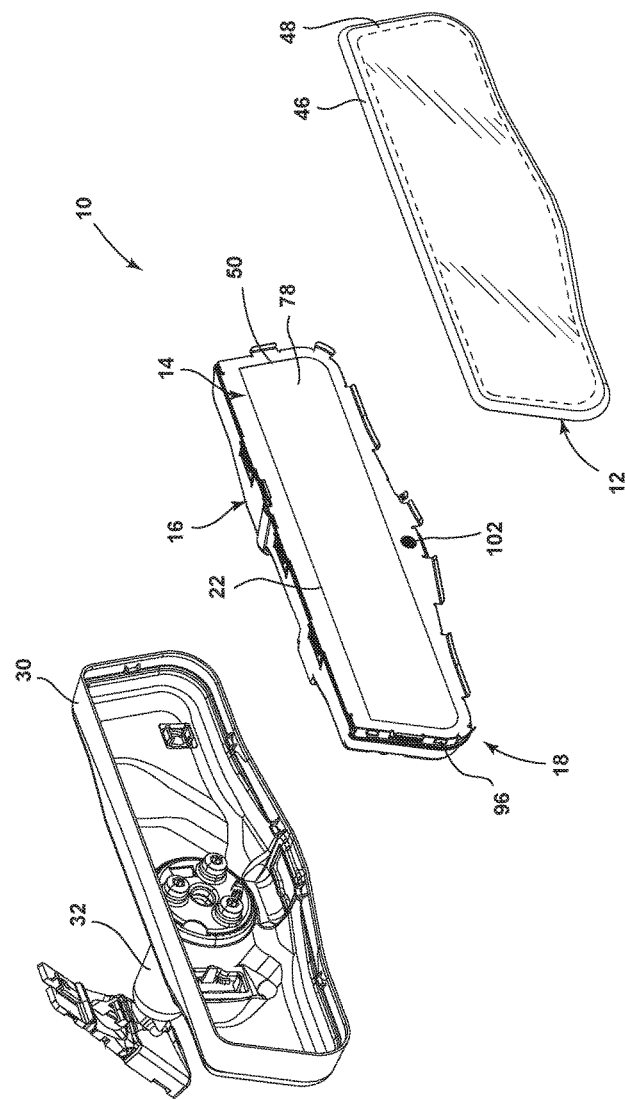
FIG. 2 is a partially exploded top perspective view of the rearview assembly shown in FIG. 1A.

FIGS. 1A, 1B, and 2 show a rearview assembly 10 that includes a glass cover element 12, shown in the form of an optional mirror element 12, and a housing 30. Housing 30 is configured to be mounted via a mount 32 (FIG. 2) to a windscreen or header of a vehicle in the manner in which interior rearview mirror assemblies are typically mounted. As shown in FIG. 2, rearview assembly 10 includes a display module 18 positioned behind mirror/glass element 12 so as to project and display images therethrough. Rearview assembly 10 may also optionally include a bi-modal switch 200 (FIGS. 1A and 1B) configured to at least one of activate and deactivate the display module 18 and alter a position of the glass element 12 to alternate between a first position and a second position. Pivoting the rearview assembly 10 when the display module 18 is activated can reduce unwanted reflections that detract from the displayed image. In both day and night time driving conditions, unwanted reflections can occur (e.g., backgrounds with high levels of ambient light, and headlamps when the reflected images thereof may not line up with the headlamps shown in the display module 18).

As shown in FIG. 2, the glass element 12 is generally planar, with an outer perimeter 46 and a border 48 around the outer perimeter 46. The border 48 may incorporate a chrome ring or other similar finish to conceal a front shield 14 and other elements located behind the glass element 12 in the rearview assembly 10, including, without limitation, a seal on an electrochromic unit, an applique, foam adhesive, or pad printing. The border 48 may extend from the outer perimeter 46 of the glass element 12 to an outer edge 50 of a display 22. Alternatively, the border 48 may be narrower and not reach from the outer perimeter 46 to the outer edge 50 of the display 22 along at least some portions of the border 48. The perimeter of the glass element 12 may also have a ground edge, a beveled edge, or be frameless.

The glass element 12 may be an electro-optic element or an element such as a prism. One non-limiting example of an electro-optic element is an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "ELECTROCHROMIC LAYER AND DEVICES COMPRISING SAME," U.S. Pat. No. 5,998,617 entitled "ELECTROCHROMIC COMPOUNDS," U.S. Pat. No. 6,020,987 entitled "ELECTROCHROMIC MEDIUM CAPABLE OF PRODUCING A PRESELECTED COLOR," U.S. Pat. No. 6,037,471 entitled "ELECTROCHROMIC COMPOUNDS," U.S. Pat. No. 6,141,137 entitled "ELECTROCHROMIC MEDIA FOR PRODUCING A PRE-SELECTED COLOR," U.S. Pat. No. 6,241,916 entitled "ELECTROCHROMIC SYSTEM," U.S. Pat. No. 6,193,912 entitled "NEAR INFRARED-ABSORBING ELECTROCHROMIC COMPOUNDS AND DEVICES COMPRISING SAME," U.S. Pat. No. 6,249,369 entitled "COUPLED ELECTROCHROMIC COMPOUNDS WITH PHOTOSTABLE DICATION OXIDATION STATES," and U.S. Pat. No. 6,137,620 entitled "ELECTROCHROMIC MEDIA WITH CONCENTRATION ENHANCED STABILITY, PROCESS FOR THE PREPARATION THEREOF AND USE IN ELECTROCHROMIC DEVICES;" U.S. Patent Application Publication No. 2002/0015214 A1 entitled "ELECTROCHROMIC DEVICE;" and International Patent Application Nos. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," PCT/EP98/03862 entitled "ELECTROCHROMIC POLYMER SYSTEM," and PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," which are all incorporated herein by reference in their entirety. The glass element 12 may also be any other element having partially reflective, partially transmissive properties. To provide electric current to the glass element 12, electrical elements are provided on opposing sides of the element, to generate an electrical potential therebetween.

As shown in FIG. 2, rearview assembly 10 may further include a front shield 14 and a rear shield 16 that together function to shield radio frequency (RF) electromagnetic radiation and to provide support for the glass element 12 and the display module 18. The front and rear shields 14 and 16 are formed from one or more materials which are suitable to block RF radiation, including without limitation, steel. The display module 18 is disposed behind the front shield 14, with a display 22 viewable through an opening in the front shield 14. The components of display module 18 are described below with reference to FIG. 3.

The display 22 may be generally planar, with the outer edge 50 defining a front surface 78. The front surface 78 of the display 22 can be shaped to correspond to and fit within the shape of the viewing area of the rearview assembly 10. Alternatively, the display 22 may have a front surface 78 which fits within but is not complementary to the viewing area, for example, where the front surface 78 of the display 22 is generally rectangular and the front surface of the glass element 12 has a contoured outer perimeter 46. The distance between the outer edge 50 of the display 22 and the outer perimeter 46 of the glass element 12 is about 9 mm or less along at least a portion of the outer edge 50. In one embodiment, the display 22 has a viewable front surface 78 area, which is about 56 to about 70 percent of the viewing area of the glass element 12.

A glare sensor 102 may be provided in a location which receives light through the glass element 12, and which is not behind the display 22. The glare sensor 102 receives light from head lamps of a trailing vehicle, and measures information regarding the likely glare visible on the glass element 12 and communicates this information to the rearview assembly 10 so that the rearview assembly 10 can be optimized to allow viewing of the display 22 through the glass element 12. The glare sensor 102 could also be packaged at least partially within the housing 30 of the rearview assembly 10 and have a light guide which is configured to propagate light to the glare sensor 102. The glare sensor 102 could also be an imager on a rear portion of the vehicle, wherein a signal representative of the received light is communicated from the glare sensor 102 to the rearview assembly 10.

Additional details of the rearview assembly shown in FIGS. 1A, 1B, and 2 are disclosed in U.S. application Ser. No. 14/494,909 entitled "DISPLAY MIRROR ASSEMBLY," filed on Dec. 15, 2014, on behalf of Ethan Lee et al., the entire disclosure of which is incorporated herein by reference.

Figure 3:
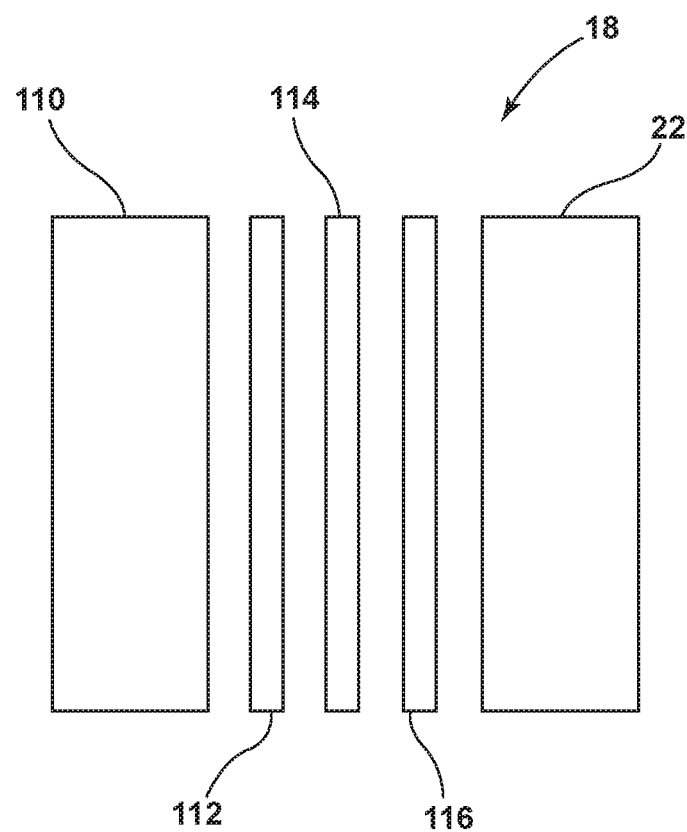
FIG. 3 is a schematic side view of a display and backlight assembly according to an embodiment described herein.

FIG. 3 schematically illustrates an embodiment of a display module 18. As shown, a light source in the form of an LED light engine 110 is provided with an exit aperture from which light exits from the LED light engine 110. The LED light engine 110 may be a direct backlight or an edge-lit configuration. Coupled to the LED light engine 110 exit aperture is a first BEF 112 positioned to receive light from the LED light engine 110. The first BEF 112 has a plurality of prismatic elements extending in a first direction. A diffuser 114 is positioned to receive light from the first BEF 112 and diffuse the light toward a second BEF 116. The second BEF 116 is positioned to receive light exiting the diffuser 114 and is provided having a plurality of prismatic elements extending in a second direction. The second direction may be substantially perpendicular to the first direction. Display 22 is disposed to receive light from the second BEF 116. In some embodiments, the first direction of the plurality of prismatic elements is substantially vertical with respect to the rearview assembly 10 and the second direction of prismatic elements is substantially horizontal with respect to the rearview assembly 10. In other embodiments, the first direction is substantially horizontal and the second direction is substantially vertical with respect to the rearview assembly 10.

In the depicted embodiment, the diffuser 114 has a transmissivity to light greater than about 93% and more specifically between about 97% to about 98%. The diffuser 114 may have a thickness of about 115 microns, with about 100 microns of the thickness being a base film and about 15 microns being a diffuser film. The overall thickness of the diffuser may vary up to about 15 microns. The base film may include a polyethylene terephthalate base layer and a back coating which functions as an anti-static surface. The diffuser 114 may have a haze of between about 80% and 90%. Haze is a measurement of wide angle scattering of the light as it passes through diffusion films. In some embodiments, the haze is approximately 84% while in other embodiments it is about 89.5%. According to one example, the diffuser 114 may be a diffusion film available from Kimoto™ Corporation.

According to one example, the first and second BEFs 112 and 116 may each be a 90-50 BEF available from 3M Corporation, and display 22 may be an in plane switching type (IPS-Type) LCD. LED light engine 110 may take various forms such as a direct LED light engine such as disclosed in United States Patent Application Publication No. 2009/0096937 A1 entitled "VEHICLE REARVIEW ASSEMBLY INCLUDING A DISPLAY FOR DISPLAYING VIDEO CAPTURED BY A CAMERA AND USER INSTRUCTIONS," filed on Aug. 18, 2008, on behalf of Frederick T. Bauer et al., the entire disclosure of which is incorporated herein by reference, or an edge-illuminated LED light engine such as disclosed in United States Patent Application Publication No. 2013/0321496 A1 entitled "SEGMENTED EDGE-LIT BACKLIGHT ASSEMBLY FOR A DISPLAY," filed on May 29, 2012, on behalf of Andrew Weller et al., the entire disclosure of which is incorporated herein by reference.

Cross hatching may be reduced by providing an anti-glare polarizer, such as a Nitto Denko AGT1 anti-glare polarizer, on the front surface of the display. Such an anti-glare polarizer further reduces cross-hatching without reducing the intensity of the display 22.

When the rearview assembly 10 is used within a vehicle, it is typically viewed at an angle between about +15° to about +25° or about −15° to about −25° by a driver of the vehicle. Occupants of the front passenger seat of the vehicle typically view the assembly 10 at about a +40° to about a +50° angle or about a −40° to about a −50° angle. Positive designations of angles indicate viewing angles along the 0° horizontal axis, while negative designations of angles indicate viewing angles along the 180° horizontal axis. These angles can increase and decrease based on the length and positioning of the rearview assembly 10. Other occupants of the vehicle may view the display at angles ranging between about −25° to about −40° and about +25° to about +40°. Typically, the occupants of the vehicle view the rearview assembly 10 at a substantially horizontal angle with respect to the rearview assembly 10, with only about 1° to about 6° variation in the vertical viewing angle, and more specifically about 3°. In some situations, it is beneficial that all occupants of the vehicle may see information (e.g., digital compass, seatbelt indicator, weather data) displayed by the rearview assembly 10 with the maximum luminance possible.

The luminance of the rearview assembly 10 changes with respect to the angle at which it is viewed. Due to the geometry of the rearview assembly 10 and the proximity to front seat passengers, different portions of the display 22 may be simultaneously viewed at different angles by the same passenger. For example, a driver may view a driver-side portion of the assembly 10 at about a −15° angle and may view a passenger-side portion of the assembly 10 at about a −25° angle. The change in luminance across angles may lead to one portion of the rearview assembly 10 appearing darker than another, or may provide a lower luminance to one occupant than another. Additionally, the use of BEFs having prismatic elements oriented in different directions can lead to light cancellation zones. The light cancellation zones are perceived by the viewer as dark spots where the local illumination of the display 22 is lower than the surrounding display 22. Further, light is often emitted from the prior art displays at angles which are unlikely to be viewed by occupants of the vehicle and therefore the emitted light is used inefficiently. Accordingly, it is advantageous to produce a display module 18 which uses light efficiently and in a manner which does not produce dark spots within the range of likely viewable angles.

EXPERIMENTAL RESULTS

Figure 4A:
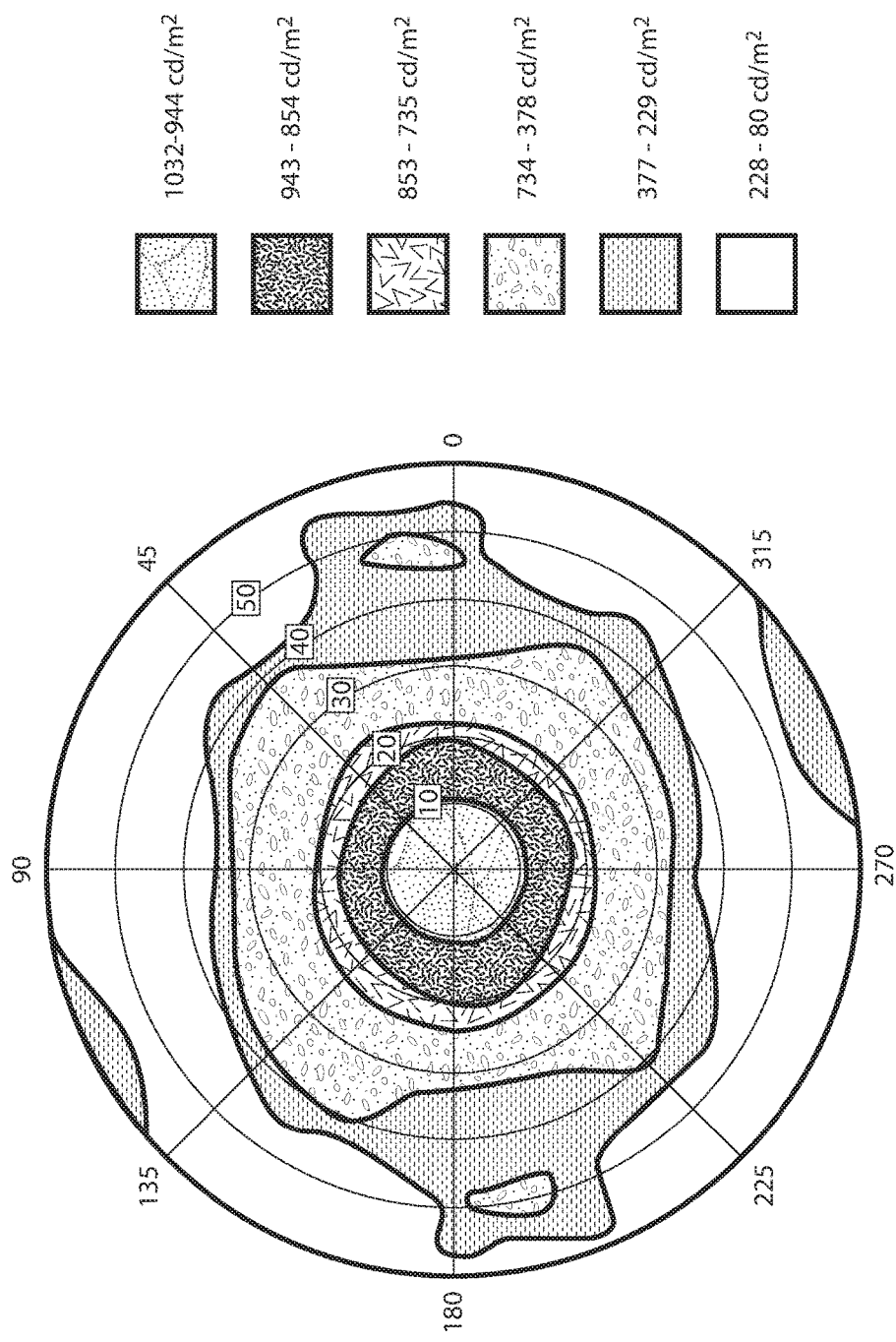
FIG. 4A is a polar plot of a luminance emitted by the rearview assembly according to one embodiment.
Figure 4B:
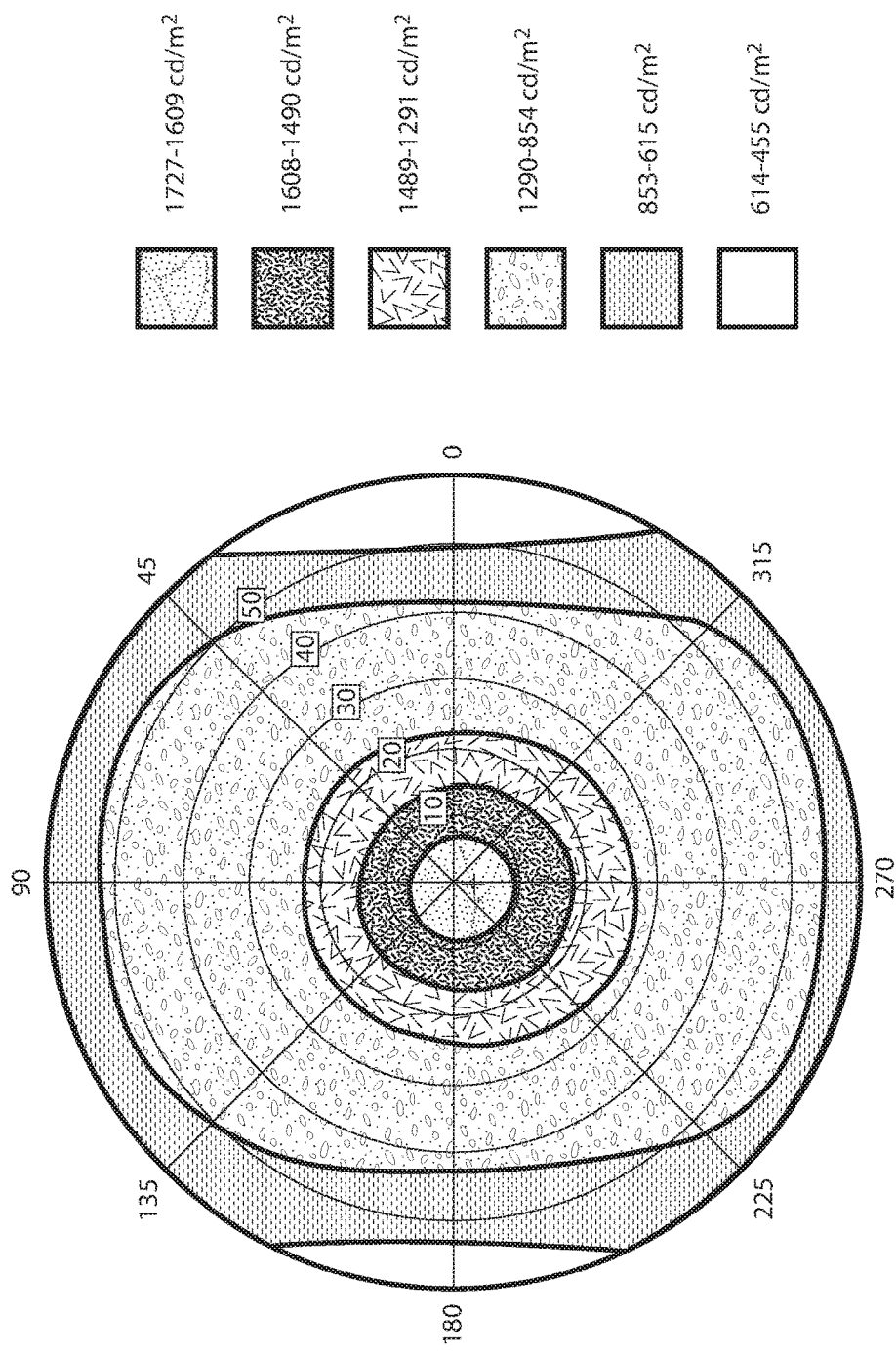
FIG. 4B is a polar plot of a luminance emitted by the rearview assembly according to another embodiment.
Figure 4C:
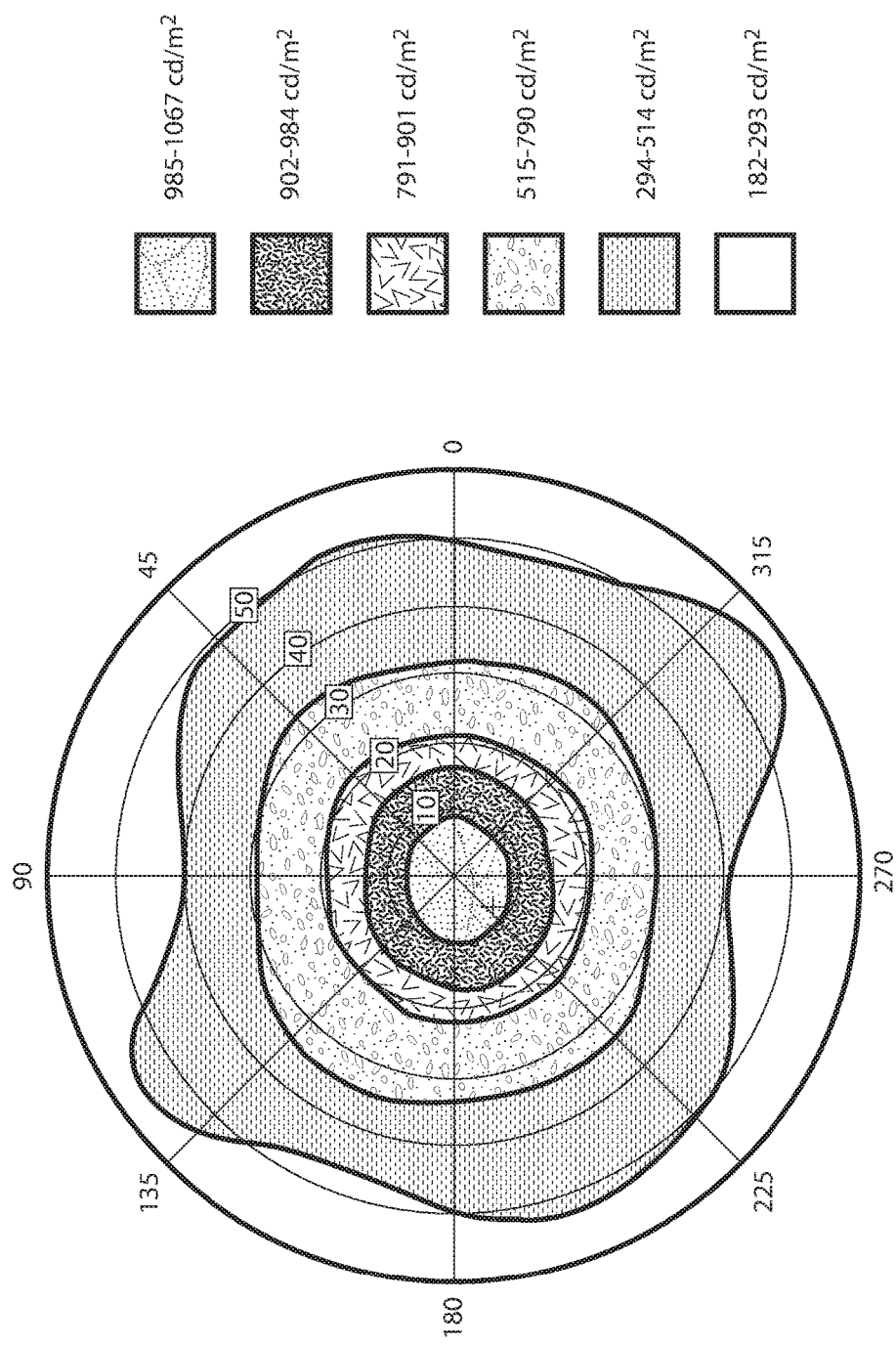
FIG. 4C is a polar plot of a luminance emitted by the rearview assembly according to yet another embodiment.

With reference to FIGS. 4A-4D, polar plots are shown depicting experimental results of luminance values obtained from several configurations of displays used in rearview mirror assembly 10. FIGS. 4A-C depict luminance values of prior art configurations of display modules where diffusers are placed behind or in front of two BEFs, respectively. Additionally, the prismatic elements of the first and second BEFs of the prior art displays are in a different order than the present disclosure. Further, the diffusers of the prior art embodiments have a lower transmissivity of light (e.g., about 75%) than the diffuser 114 of the present disclosure. Generally, the prior art configurations lead to a lower overall luminance, less uniform change in luminance with changing angle, and/or dark spots along the horizontal axis of the rearview assembly 10.

Depicted in FIG. 4A is a polar plot of the luminance of a prior art configuration of a display module for the rearview assembly 10. The display module includes, in order from back to front, a light source, a diffuser, a first BEF, and a second BEF. The diffuser has a transmissivity to light of about 75%. In this particular configuration, the first BEF has a plurality of vertical prismatic elements and the second BEF has a plurality of horizontal prismatic elements. As can be seen from the polar plot, the luminance undergoes a large change across the horizontal axis of the polar plot between the likely viewed angles with relation to the overall scale of values. In fact, the luminance change is about 853 cd/m$^2$ to about 229 cd/m$^2$ between a +10° and about +50° and about a −10° and about −50° along the horizontal axis of the plot. This results in a decrease of approximately 624 cd/m$^2$, or about a 60% decrease in luminance, across the likely viewing angles. Additionally, it can be seen between the +40° and +50° viewing angle that the luminance decreases and then increases. This would result in a perceived dark spot for the viewer in addition to the viewer perceiving an overall shift in luminance across the rearview assembly 10. A similar effect is seen along the horizontal axis line between the −30° and −50° viewing angle.

Depicted in FIG. 4B is a polar plot of the luminance of another prior art embodiment of a display module having, in order from back to front, a light source, a first BEF, a second BEF, and a diffuser. The diffuser has a transmissivity to light of about 75%. In this particular configuration, the first BEF has a plurality of horizontal prismatic elements and the second BEF has a plurality of vertical prismatic elements. While the re-ordering of the BEFs and the diffuser removed the dark spots seen in FIG. 4A, light from the light source is still distributed into vertical viewing angles not likely to be readily perceived by an occupant of the vehicle. For example, for an occupant to observe the 40° viewing angle along the 90 degree axis, the driver's head would need to be against the ceiling or near the floor of the vehicle, both of which are unlikely viewing positions. Accordingly, because light is exiting the display at angles occupants are unlikely to observe, the assembly is inefficient because it could be directing that light toward the likely viewing angles along the horizontal axis, thus increasing the perceived luminance by the occupant.

With reference to FIG. 4C, depicted is a polar plot of the luminance of another prior art embodiment of a display module having, in order from back to front, a light source, a diffuser, a first BEF, a second BEF, and a polarized diffuser. In this particular configuration, the first BEF has a plurality of vertical prismatic elements and the second BEF has a plurality of horizontal prismatic elements. The diffuser has a transmissivity to light of approximately 75%. The polarized diffuser includes a polarizing layer and a diffusing layer. The polarized diffuser has a thickness between about 0.2 millimeters and about 1.0 millimeters leading to an overall increase in the thickness of the display module relative to other prior art display module embodiments. Additionally, the peak luminance values have been reduced to approximately 1067 cd/m$^2$ due to the use of two diffusers, one of the diffusers having the additional polarizing layer. As can be seen in FIG. 4C, the luminance across the likely viewing angles undergoes a large decrease which would be perceived by a viewer of the display module.

Figure 4D:
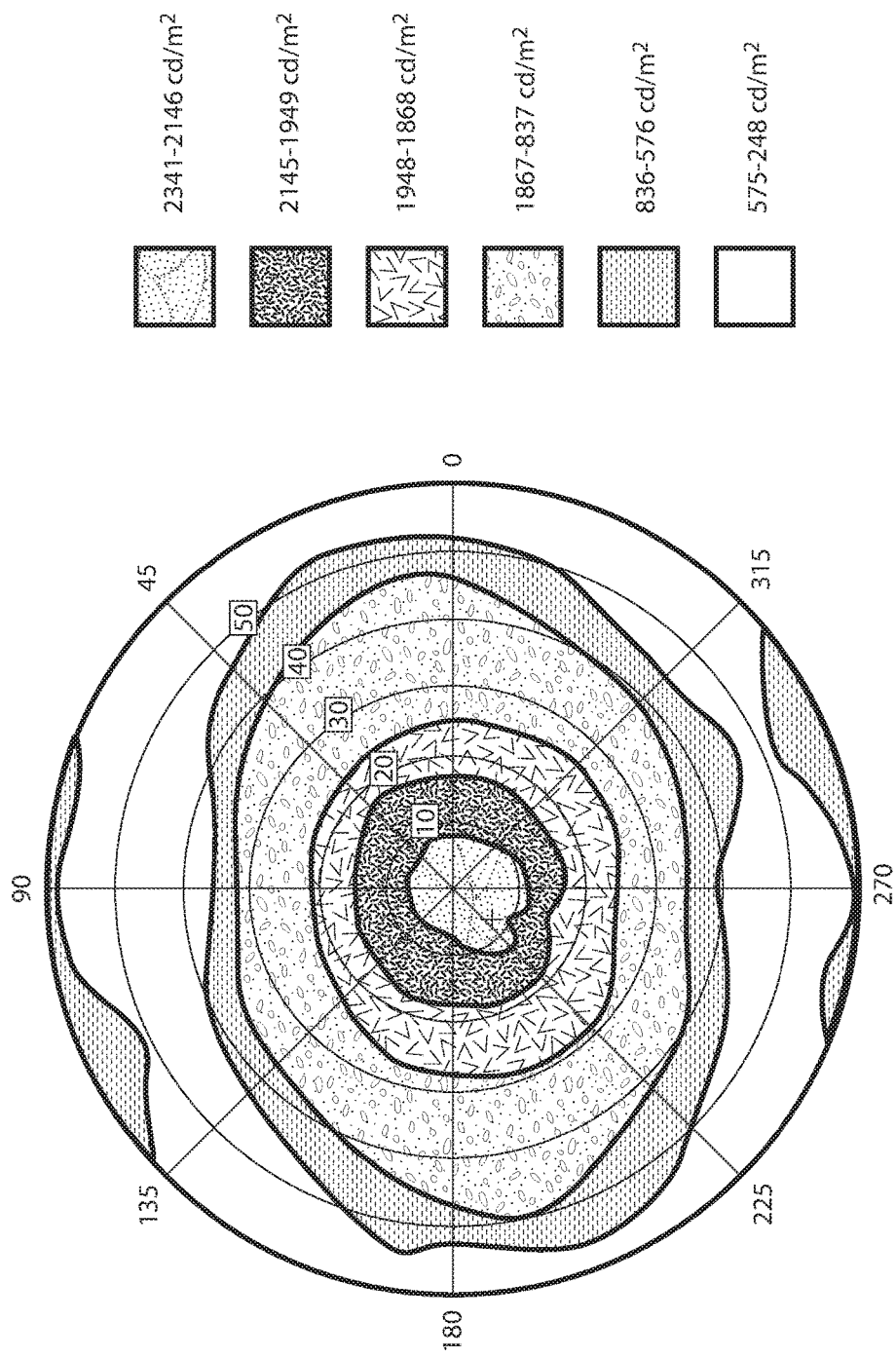
FIG. 4D is a polar plot of a luminance emitted by the rearview assembly according to an additional embodiment.

Referring now to FIG. 4D, depicted is a polar plot of the luminance of the rearview assembly 10 incorporating an embodiment of the display module 18 described above. In the embodiment of the backlighting assembly that produced the depicted embodiment, the first BEF 112 is positioned adjacent the LED light engine 110 such that light emitted from the LED light engine 110 enters the first BEF 112. The first direction of prismatic elements on the first BEF 112 is substantially vertical. The diffuser 114, which has a transmissivity of greater than about 97%, is placed next to the first BEF 112 such that the directed light exiting the first BEF 112 is diffused by the diffuser 114. Finally, diffused light exits the diffuser 114 and enters the second BEF 116 which has a plurality of prismatic elements oriented in the second direction which is substantially horizontal with relation to the rearview assembly 10.

Referring again to FIG. 4D, the orientation and configuration of the first and second BEFs 112, 116 and the diffuser 114 spreads the light of the LED light engine 110 in an oblong pattern across the horizontal axis of the polar plot. As can be seen, between the likely viewed angles of about +25 degrees to about +50 degrees and about −25 degrees to about −50 degrees, the rearview assembly does not produce dark spots as in FIG. 4A. Additionally, by using diffuser 114 which has a transmissivity greater than about 95% in front of the first BEF 112, and behind the second BEF 116, the display 22 typically has greater overall luminance values, as well as increased luminance values across likely viewed angles, than the embodiments of FIGS. 4A-C. This means that more light from the LED engine 110 is making it to the display 22. By directing the light such that it is substantially emitted toward likely viewing angles, as done in the embodiment of FIG. 4C, the light is being used more efficiently than in the prior art designs.

Although disclosed with respect to a display having essentially the same full size as the glass element 12, the present disclosure may be used in displays of various sizes whether included in a rearview assembly or not. For example, the present invention may be incorporated in human-machine-interfaces, televisions, and other displays frequently viewed at an angle.

It will be appreciated that embodiments of the invention described herein may be comprised of one or more conventional processors and unique stored program instructions that control one or more processors to implement, in conjunction with certain non-processor circuits, some, most, or all of the functions of a rearview assembly 10, as described herein. The non-processor circuits may include, but are not limited to, signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

According to one embodiment, a rearview mirror assembly for a vehicle includes a housing for attachment to the vehicle, a mirror element disposed in said housing and a display assembly disposed behind said mirror element in said housing. The display assembly includes the backlight assembly and a display element disposed to receive light from a second brightness enhancement film.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A backlight assembly for a display having a polarized transmission axis comprising:
   a light source for emitting light;
   a first brightness enhancement film having a plurality of prismatic elements extending in a first direction, and positioned to receive light emitted from the light source;
   a second brightness enhancement film having a plurality of prismatic elements extending in a second direction; and
   a diffuser positioned to receive light exiting the first brightness enhancement film, wherein light exiting the diffuser enters the second brightness enhancement film.

2. The backlight assembly of claim 1, wherein the first direction of the plurality of prismatic elements of the first brightness enhancement film is substantially vertical relative to the display.

3. The backlight assembly of claim 2, wherein the second direction of the plurality of prismatic elements of the second brightness enhancement film is substantially horizontal relative to the display.

4. The backlight assembly of claim 1, wherein the diffuser has a transmissivity greater than about 90%.

5. The backlight assembly of claim 4, wherein the transmissivity of the diffuser is greater than about 95%.

6. The backlight assembly of claim 3, wherein said light source is an LED light engine.

7. The backlight assembly of claim 1, wherein the backlight assembly is configured to have a substantially uniform luminance between at least one of: about a +30 degree viewing angle and about a +50 degree viewing angle across a horizontal axis thereof; and about a −30 degree viewing angle and about a −50 degree viewing angle across a horizontal axis thereof.

8. The backlight assembly of claim 1, wherein the display includes a display element disposed to receive light from said second brightness enhancement film.

9. The backlight assembly of claim 8, wherein said display is a liquid crystal display.

10. The backlight assembly of claim 9, wherein said liquid crystal display is an IPS-Type liquid crystal display.

11. The backlight assembly of claim 1, wherein the first direction of the plurality of prismatic elements of the first brightness enhancement film is substantially vertical, the second direction of the plurality of prismatic elements of the second brightness enhancement film is substantially horizontal and the diffusor has a transmissivity greater than about 95%.

12. A display comprising:
a light source for emitting light;
a first brightness enhancement film having a plurality of prismatic elements extending in a first direction, and positioned to receive light emitted from said light source;
a second brightness enhancement film having a plurality of prismatic elements extending in a second direction and positioned to receive light exiting said first brightness enhancement film; and
a diffuser having a transmissivity to light of about 97%, wherein the diffuser is disposed between the first brightness enhancing film and the second brightness enhancing film,
wherein the display is configured to have a substantially uniform luminance between at least one of: about a +30 degree viewing angle and about a +50 degree viewing angle across a horizontal axis thereof; and about a −30 degree viewing angle and about a −50 degree viewing angle across a horizontal axis thereof.

13. The display of claim 12, further comprising:
a display element, wherein said display element is an IPS-Type liquid crystal display.

14. A rearview assembly for a vehicle comprising:
a housing for attachment to the vehicle;
a glass element disposed in said housing; and
a display disposed behind said glass element in said housing, said display comprising:
a light source for emitting light;
a first brightness enhancement film having a first plurality of prismatic elements extending in a first direction, and positioned to receive light emitted from said light source;
a diffuser configured to transmit about 97% of light from the first brightness enhancing film;
a second brightness enhancement film having a second plurality of prismatic elements extending in a second direction and positioned to receive light exiting said diffuser; and
a display element disposed to receive light from said second brightness enhancement film,
wherein the first direction is substantially vertical and the second direction is substantially horizontal relative to the rearview assembly.

15. The rearview assembly of claim 14, wherein said glass element is a mirror element.

16. The rearview assembly of claim 15, wherein said mirror element is partially reflective and partially transmissive.

17. The rearview assembly of claim 15, wherein said mirror element is an electrochromic mirror element.

18. The rearview assembly of claim 14, wherein said light source is an LED light engine.

19. The rearview assembly of claim 17, wherein said display element is a liquid crystal display.

20. The rearview assembly of claim 15, wherein said liquid crystal display is an IPS-Type liquid crystal display.

* * * * *